April 22, 1924.

W. H. SAUVAGE 1,491,753

COMBINED HAND AND POWER BRAKE

Filed Sept. 16, 1919    5 Sheets-Sheet 1

Inventor
W. H. Sauvage

By
Attorneys

April 22, 1924.

W. H. SAUVAGE 1,491,753

COMBINED HAND AND POWER BRAKE

Filed Sept. 16, 1919    5 Sheets-Sheet 2

Inventor.
William H. Sauvage.
By Browne & Phelps
Attys.

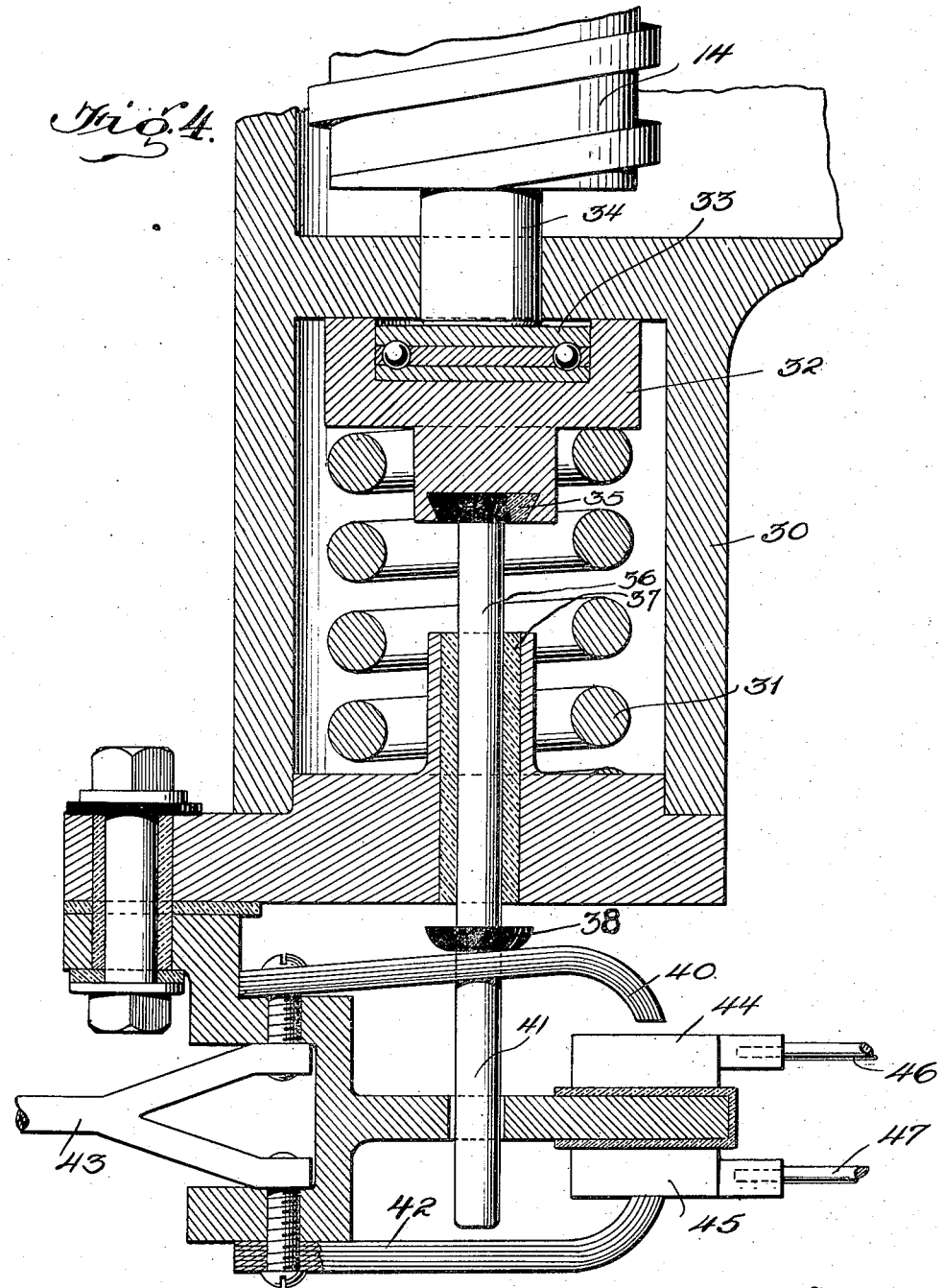

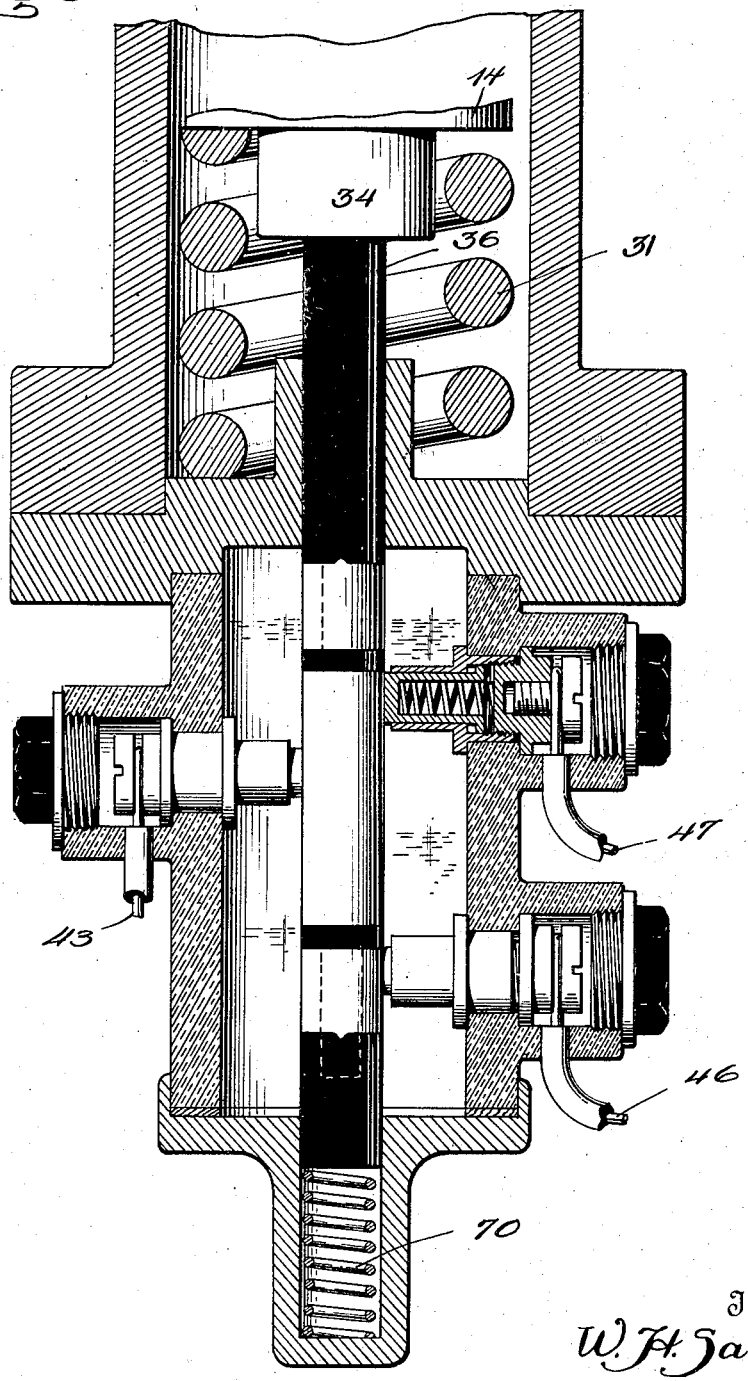

Patented Apr. 22, 1924.

1,491,753

UNITED STATES PATENT OFFICE.

WILLIAM H. SAUVAGE, OF FLUSHING, NEW YORK.

COMBINED HAND AND POWER BRAKE.

Application filed September 16, 1919. Serial No. 324,139.

*To all whom it may concern:*

Be it known that I, WILLIAM H. SAUVAGE, citizen of the United States, residing at Flushing, Long Island, in the county of Queens and State of New York, have invented certain new and useful Improvements in Combined Hand and Power Brakes, of which the following is a specification.

This invention relates to an improvement in brakes for railway vehicles and more particularly to a combined power and hand brake particularly adapted for use on railway cars of the suburban type, although it is of course to be understood that without material modification the invention is applicable to any form of automobile or railway vehicle whether gas, electrically or steam driven provided there is a convenient source of electrical energy.

The present invention deals more particularly with that type of railway vehicle brakes capable of high power and quick action, which may be operated either by hand or by power at will and both independently of the operation of the other.

One of the objects of the present invention is to eliminate as much as possible the complicated mechanism now employed in railway vehicles, such as air brakes, pumps, reservoirs, generators, brake cylinders, triple valves, and so forth, that are so numerous, troublesome, expensive and complicated that the efficiency of the brake mechanisms of this character now employed is materially reduced.

A further object is to provide a combined hand and power brake mechanism which can be easily and inexpensively applied to cars, or used to replace the mechanisms now installed without altering the foundation brake rigging.

A further object is to provide a high power, quick acting combined brake in which either part is independently operable of the other, or together therewith, or whereby either may be released independently of the other.

A further object is to provide a small, compact, yet strong, durable and efficient brake mechanism of the above character which may be conveniently installed on the front of a car or in the vestibule thereof where it will be substantially out of the way and free from the dust and dirt or under the car in connection with the foundation brake rigging.

Briefly stated the invention may be said to comprise in its broadest aspect a hand brake mechanism, a reversible motor connected with the gearing thereof, and an independent controller for the motor, and certain safety features whereby the motor will be automatically stopped after a predetermined load is applied to the brakes.

The electric control is such that it may be operated either with storage batteries or direct trolley or third rail current. The mechanism for the sake of safety is controlled automatically. When maximum predetermined power is reached an electric breaker automatically cuts off the power in case the operator should leave his controller handle in "on" application or emergency position. It thus prevents excessive braking and also prevents the motor from stalling or otherwise damaging the equipment. When reversing the motor by the reverse action of the controller handle a double breaker acts the same way in the "reverse" position as the "forward" position.

When no more load is on the control spring the breaker stem is moved automatically so that the current breaker cuts off one of the live wires from the controller, thus stopping the motor automatically by this double automatic breaker in both directions. Without this maximum and minimum control electric power could not be used nor has it ever been possible to do so heretofore.

In the accompanying drawings where one of various possible embodiments of the present invention is shown, together with certain modifications of details, Figure 1 is an elevational view of such parts of the complete installation as is necessary to understand the invention.

Figure 4 is a detail view showing one form of circuit closer associated with one of the safety features.

Figure 5 is a similar view showing a modified form of the invention disclosed in Figure 4.

Figure 1:
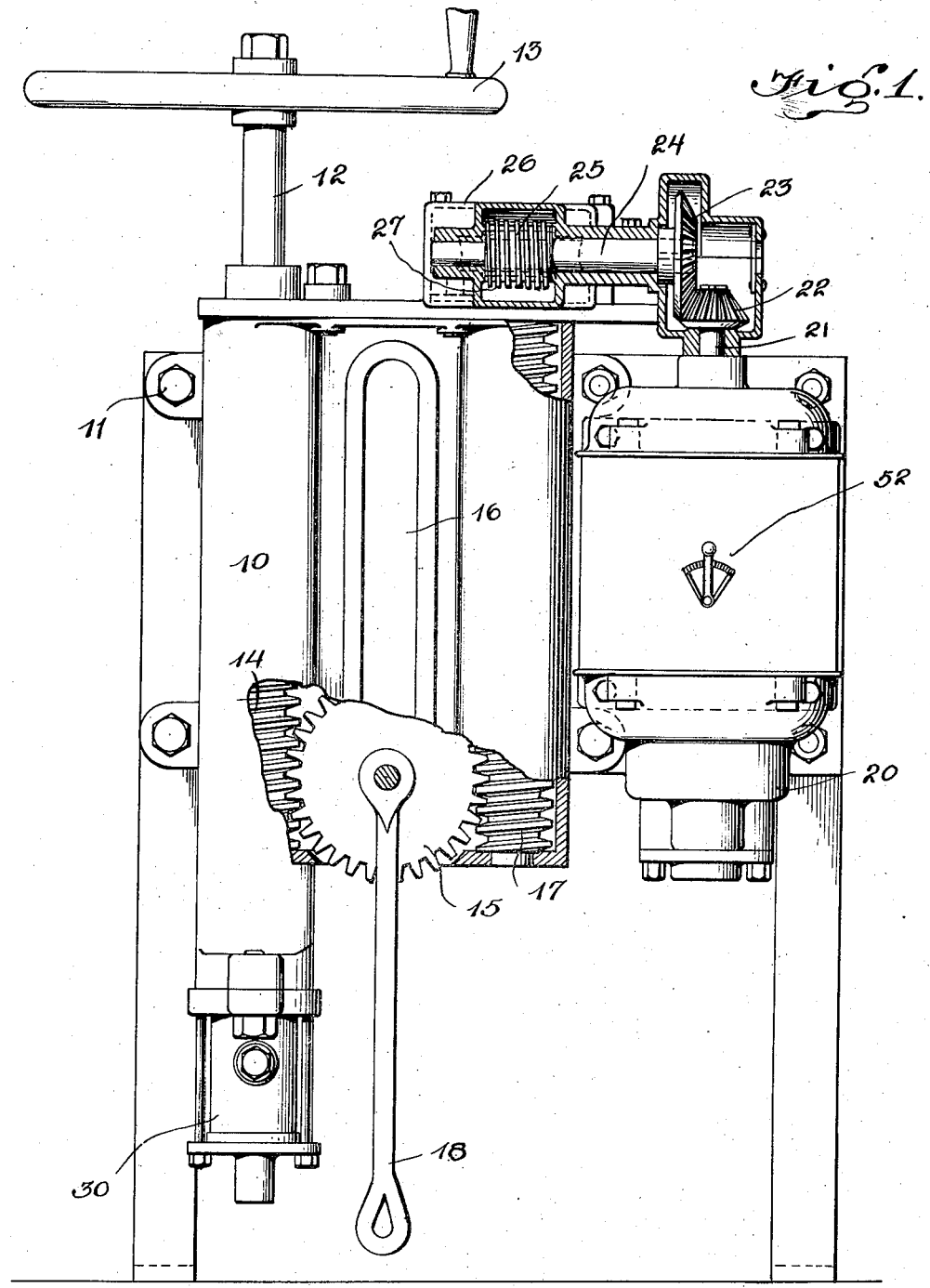
Figure 2:
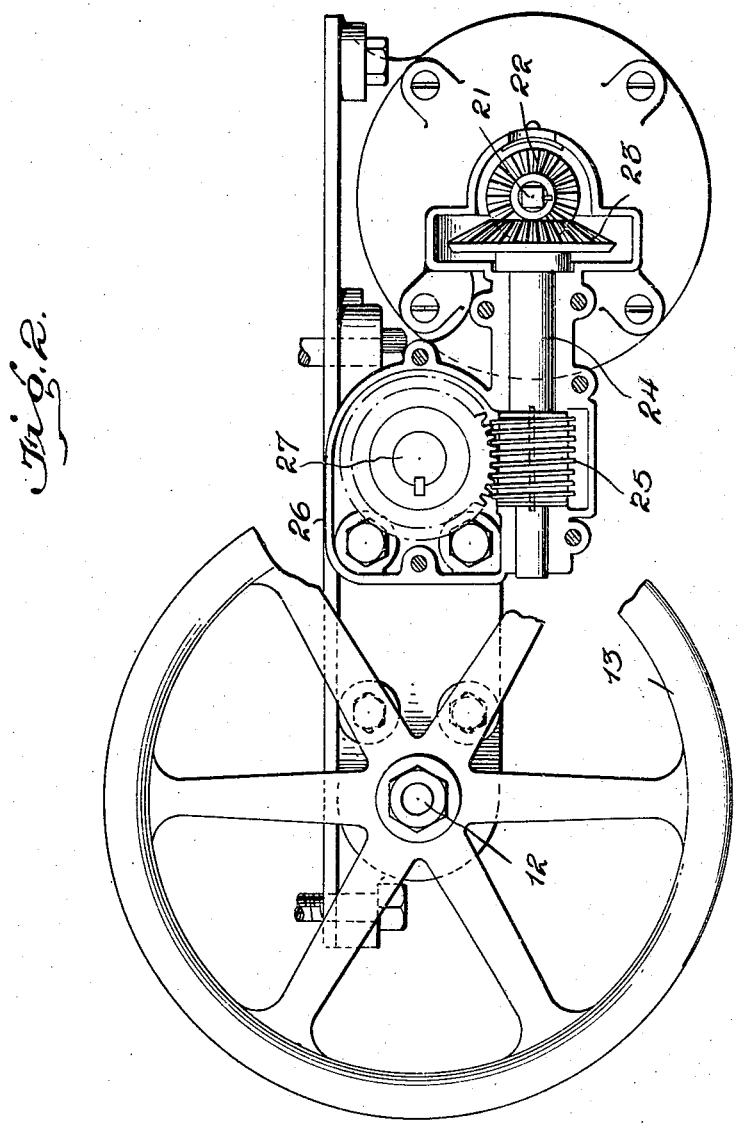
Figure 2 is a plan view of the device shown in Figure 1, certain parts being broken away.

Referring now to the drawings in detail and more particularly to Figure 1, 10 denotes a casing of general rectangular shape provided with any desired form of fastening means 11, whereby the same may be conveniently mounted on the end wall, or the under part of the car floor, as desired, according to the particular point at which the braking unit is to be applied. As herein described, however, it will be assumed to be applied to the front end of a car. This casing 10 is provided at one side with a shaft 12 having a hand wheel 13 and on the shaft is a worm 14 adapted to mesh with a gear or pinion 15 adapted to travel in suitable guides 16 formed on the front and rear walls of the casing 10.

At the opposite side of the casing there is a second worm 17 with which the opposite side of the pinion is adapted to mesh. Connected with the pinion is a pull link 18, the lower end of which is adapted to be connected by a chain or other power transmitting mechanism with the brake rigging.

It will thus be seen that when the hand wheel 13 is rotated the worm 14 will cause the pinion 15 to revolve and act as a travelling lever, due to its engagement with the opposite worm 17, thus causing the link 18 to move relatively upwards and apply the brakes.

Mounted at one side of this brake housing 10 is a reversible motor 20 of any standard commercial type, provided with a power delivering shaft 21 upon which a bevel gear 22 is mounted. This gear 22 meshes with a second gear 23 on a shaft 24, provided with a worm 25 located within a suitable housing 26 and adapted to mesh with a pinion 27 on the upper end of the shaft carrying the worm 17.

It will thus be seen that when the motor rotates power will be transmitted therefrom through this gearing and cause a relative rotation of the worm 17 and a consequent rotation of the pinion 15 relative to the worm 14 at the opposite side of the casing 10. The same pull is exerted upon the link 18 and the brakes applied. Thus either the hand power or motor power may be used at will or together to apply the brakes and conversely both may be released independently or simultaneously.

At the lower end of the casing 10 is a motor limit switch forming one of the safety features of the present device whereby it would be impossible to cause serious damage or breaking of the apparatus should the operator inadvertently or intentionally leave his controller in "on" position too long. This mechanism which is shown in different forms more in detail in Figures 4 and 5, comprises a suitable housing 30 within which is a spring 31 normally under compression and urging a member 32 carrying a thrust bearing 33 into engagement with the lower end of the shaft 34 carrying the worm 14.

This member has an insulating block 35 at its lower end normally engaged by a pin 36. The lower end passes through an insulated bushing 37 and has near its lower end a stop 38 normally engaging a spring contact 40.

The end portion 41 of the pin 36 extends downwardly to a point just out of contact with a second spring contact 42. The contacts 40 and 42 are electrically connected to lead wire 43. Co-acting contacts 44 and 45 are however insulated from each other and connected with wires 46 and 47 forming part of the reversing circuit, all of which will be presently explained in detail in connection with Figure 3.

From the above it will be seen that when excessive braking power is applied by continued rotation of the motor, the load on the compression spring 31 will cause the same to be still further compressed by the downward push exerted on the stub shaft 34. This relative movement will cause the contact 40 to engage the co-acting contact 44 and simultaneously break the contact between the parts 42 and 45.

Figure 3:
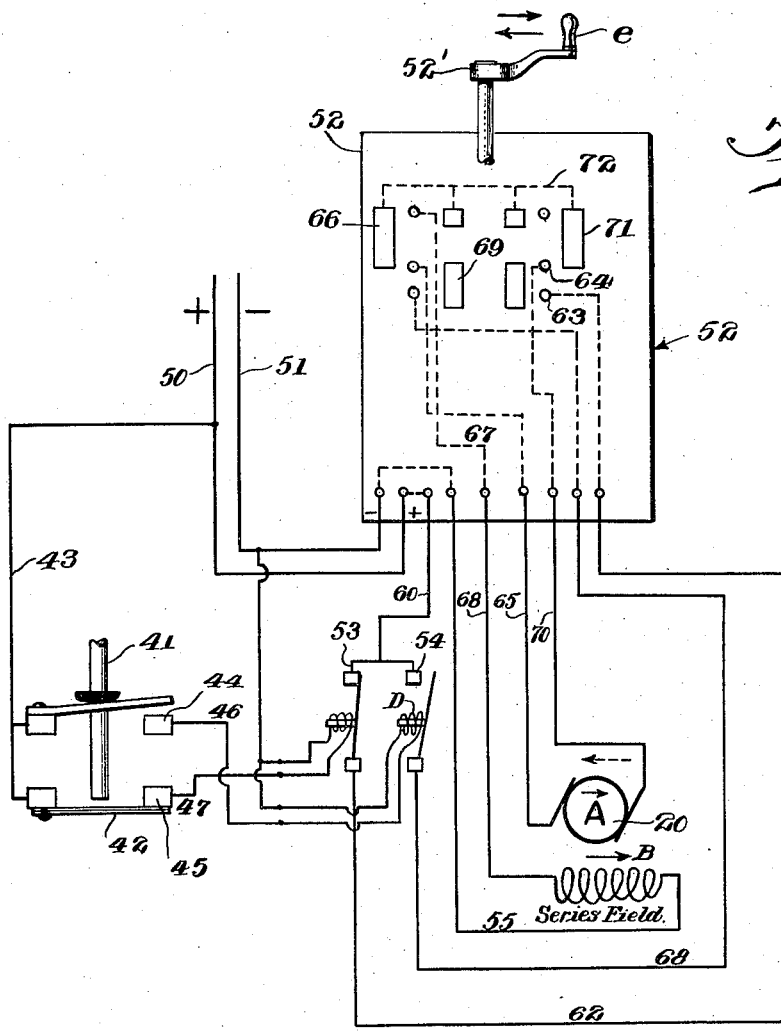
Figure 3 is a diagrammatic view showing the electric circuits.

From the diagrammatic showing in Figure 3, it will be seen that the object of the mechanical breaker shown in Figure 4 and Figure 5 is to break the main circuit to the motor when the torque on the driving motor reaches a predetermined maximum value, and at the same time, close a contactor in a parallel circuit, the motor, upon the manual operation of the main controller 52 will revolve in the opposite direction, thereby relieving the strain on the system and permitting the release of the brakes.

Referring more in detail to Figure 3, current is supplied to the main positive lead 50, passes through lead 60 to contactor 53, thence through 62 to contact 63, contact block 64 and thence through the armature in the direction shown by the dotted arrow; then through lead 65, across contact member 66, through leads 67 and 68, through the field in the direction of the arrow B, and then returning through lead 55 to the negative side 51 of the main circuit.

As hereinafter mentioned, when the load reaches its maximum value, plunger 41, (see Figure 4) will be forced down against the resistance of spring 31, making contact 40—44, and opening contact 42—45, thereby energizing control magnet D, operating contactor 54, closing the same, and simultaneously opening contactor 53, thereby stopping the motor and making the circuits for reverse direction of the motor upon the manual operation of the main rheostat har lle 52' in the direction of the arrow E. Tracing this last mentioned circuit, current enters through positive lead 50, connector 60, through contactor 54, through lead 68, connector strip 69, lead 65, through the armature in the direction of the solid arrow, through lead 70, contact strip 71, connector 72, and returning through leads 67 and 68, passing through the field in the same direction as before, and returning to the negative side 51 of the line through lead 55.

It will be seen from the diagram, that in both directions of the motor, the current through the series field is in the same direction, whereas the current through the armature is reversed thereby causing the reverse rotation of the motor upon the manual operation of the controller 52.

In Figure 5 wherein is shown another form of automatic breaker or pole changer the contact switch points are immersed in a well of oil, thereby to prevent any arcing when contacts are breaking by the reciprocable movement of the stem 36 which is normally urged upward by a spring 70 in the bottom of the casing. The contact points of the several wires 43, 46 and 47 may be made of carbon. When excessive load takes place the pin 36 is depressed by the stub shaft 34 against the action of the spring 31, thereby causing the contact to be broken with wire 47 and established with wire 46, thus completing the reversing circuit through the motor.

The initial cost of the brake system will be considerably less than the complicated air brake now in general use with its high cost of upkeep. This electric control brake and hand brake of the powerful worm type combined gives 100% efficiency at every application both with the hand operated and the electric means, both being governed by automatic means to prevent undesirable excessive braking power. The present hand brake staff type is variable in power and often unreliable, from 15% to 60% of its efficiency frequently being lost owing to excessive travel and unmechanical conditions prevailing. The air brake can only give intermittently 100% efficiency as when reservoirs are fully charged but at a critical time the reservoir pressure may be very low so that maximum power is not obtainable. This combined electric hand and power brake gives 100% efficiency at all times and can be instantly used in case emergency demands.

The hand brake or power mechanism can be placed underneath the car where the air brake cylinders are placed and operated electrically the same as the air brake levers. The advantages of the present construction over all other known brakes are that when applied they are self locking and do not leak on or off as the air brakes, nor do they rely on ratchets or air pressure to hold them on indefinitely. The present construction will remain applied no matter whether set by hand or power indefinitely and can be released instantly with or without power. The car motors can be used for generating power when occasion demands this connection in place of batteries or direct current. The present construction of brake operated by hand is as efficient as when operated by power, which is not the case with other known type of brake in use today.

From the above it will be seen that the present invention provides a highly efficient, inexpensive and practical combined hand and power brake well adapted to accomplish, among others, all of the objects set forth.

It is believed that the above will so fully reveal the gist of the present invention that others can by applying current knowledge readily adapt the same to various uses and modifications, and the appended claims are intended to cover all of the generic and specific features thereof that may be comprehended within the range of equivalency.

I claim—

1. In a brake mechanism of the character described, a hand operated brake mechanism comprising a hand driven member, a normally stationary member, and an actuated member therebetween, a power mechanism connected with said normally stationary member whereby said normally stationary member may be driven and the hand driven member remain idle either to apply or release the brakes.

2. In a brake mechanism of the character described, a hand operated brake mechanism comprising a hand driven worm, a normally stationary worm, a traveling member therebetween adapted to be connected with the brake rigging, and power mechanism connected with said normally stationary worm for operating the traveling member when said hand driven worm remains stationary.

3. In a brake mechanism of the character described, a hand operated brake mechanism comprising a hand driven worm, a normally stationary worm, a traveling member therebetween adapted to be connected with the brake rigging, a power mechanism connected with said normally stationary worm for operating the traveling member when said hand driven worm remains stationary, and means associated with said hand driven worm adapted to cut out the power driven mechanism when overload occurs.

4. In a brake mechanism of the character described, a driving worm, a normally stationary worm, a traveling gear therebetween adapted to be connected with the brake rigging, a motor, power transmitting means between the motor and the normally stationary worm for actuating said stationary worm when the power brakes are applied.

5. In a brake mechanism of the character described, a driving worm, a normally stationary worm, a traveling gear therebetween adapted to be connected with the brake rigging, a motor, power transmitting means between the motor and the normally stationary worm for actuating said stationary worm when the power brakes are applied, and a switch mechanism adapted to stop the motor when overload occurs.

6. In a brake mechanism of the character described, a casing, a hand operated brake mechanism positioned therein comprising a hand driven worm capable of longitudinal movement, a rotatable stationary worm, a gear between said worms connected with the brake rigging and adapted to move in a relative longitudinal direction when the brakes are applied, and a motor connected with one of said worms.

7. In a brake mechanism of the character described, a casing adapted to contain hand brake mechanism including a driving worm, a normally stationary worm and a traveling member therebetween adapted to be connected with the brake rigging, a motor connected with said normally stationary worm, a circuit connecting said motor with a suitable source of electric energy, and a switch adapted to be automatically operated on overload to stop the motor.

8. In a brake mechanism of the character described, a hand operated brake mechanism comprising a longitudinally movable driven worm, a normally stationary worm, a gear therebetween adapted to be connected with the brake rigging, a motor adapted to be connected with said normally stationary worm, and automatic means whereby the motor may be stopped upon excessive application of the brake mechanism.

9. In a hand brake mechanism of the character described, a hand operated mechanism comprising a movable driven worm, a normally stationary worm, a gear therebetween adapted to be connected with the brake rigging, a switch connected with said driven worm, a motor adapted to be connected with said normally stationary worm, said switch being located in the motor circuit whereby the motor is stopped when overload occurs, said switch including two contacts adapted to be alternately made and broken and connected with the forward and reverse circuit of said motor.

In testimony whereof I affix my signature.

WILLIAM H. SAUVAGE.